(12) United States Patent
Zanzi

(10) Patent No.: US 7,031,692 B1
(45) Date of Patent: Apr. 18, 2006

(54) PORTABLE CELLULAR TELEPHONE AND COMMUNICATION SYSTEM THEREOF

(75) Inventor: Massimo Zanzi, Sgonico (IT)

(73) Assignee: Telit Mobile Terminals S.p.A., Sgonico (*) Notice: Subject to any disclaimer, the term of this patent is extended or adjusted under 35 U.S.C. 154(b) by 223 days.

(21) Appl. No.: 10/088,371

(22) PCT Filed: Sep. 19, 2000

(86) PCT No.: PCT/IB00/01320
§ 371 (c)(1),
(2), (4) Date: Dec. 2, 2002

(87) PCT Pub. No.: WO01/22694
PCT Pub. Date: Mar. 29, 2001

(51) Int. Cl.
*H04Q 7/20* (2006.01)

(52) U.S. Cl. ............... 455/403; 455/90.3; 455/575.1; 455/346

(58) Field of Classification Search ............ 455/403, 455/90.3, 91, 95, 100, 575.1, 550.1, 552.1, 455/553.1, 556.1, 556.2, 557, 344, 346
See application file for complete search history.

(56) References Cited

U.S. PATENT DOCUMENTS

| | | | | |
|---|---|---|---|---|
| 5,189,632 A * | 2/1993 | Paajanen et al. | ............ | 708/109 |
| 5,659,888 A * | 8/1997 | Kato et al. | ............... | 455/575.1 |
| 5,796,338 A * | 8/1998 | Mardirossian | ............... | 340/571 |
| 5,818,701 A * | 10/1998 | Shindo | ........................ | 361/814 |
| 5,898,758 A * | 4/1999 | Rosenberg | ............... | 455/426.1 |
| 6,119,022 A * | 9/2000 | Osborn et al. | ............... | 455/567 |
| 6,208,867 B1 * | 3/2001 | Kobayashi | ................. | 455/462 |
| 6,240,302 B1 * | 5/2001 | Harrison | ................. | 455/556.1 |
| 6,324,380 B1 * | 11/2001 | Kiuchi et al. | ............... | 455/12.1 |
| 6,690,947 B1 * | 2/2004 | Tom | ........................ | 455/556.1 |
| 6,731,951 B1 * | 5/2004 | Takebe et al. | ............... | 455/557 |
| 6,760,600 B1 * | 7/2004 | Nickum | ....................... | 455/557 |

FOREIGN PATENT DOCUMENTS

JP 98106704 9/1999

* cited by examiner

*Primary Examiner*—CongVan Tran
(74) *Attorney, Agent, or Firm*—Levine & Mandelbaum

(57) ABSTRACT

A portable cellular telephone, has two separable parts, one for performing subscriber interface functions and another for performing transmitting and receiving functions on a cellular telephone network, the parts being in bidirectional communication with each other when separated. The part for performing interface functions is adapted for wireless communication with a further station or network.

15 Claims, 3 Drawing Sheets

PORTABLE CELLULAR TELEPHONE AND COMMUNICATION SYSTEM THEREOF

BACKGROUND OF THE INVENTION

The present invention relates to a portable cellular telephone and associated communication system with telematic services supplied by telecommunications stations and/or networks.

In recent times, telecommunications networks have experienced an extremely fast development spreading to every society level and making available to subscribers a large number of remote access services through special terminals.

The telematic services range from Internet connectivity to interactions with other network types, which may be identified by a wide geographical coverage, such as a cellular telephone network, or have a local diffusion, such as a company network, or just be simple stations for supplying services, such as a computer. Also services having access through special smartcards connected with the terminals are included in this range of telematic services.

Therefore, subscribers need to use a plurality of terminals to provide interaction with the telematic services, involving consequent encumbrance and management problems.

In addition, some of these terminals, in particular those using radio transmissions, such as cellular telephones, expose the subscriber's body to very close radio emissions. Therefore, it is obvious how such exposures are dangerous for the subscriber, and how, increasing the number of terminals causing such harmful radio emissions in contact with the subscriber, would be extremely harmful.

SUMMARY OF THE INVENTION

It is an object of the present invention to solve the above drawbacks and provide a portable cellular telephone and associated communication system with telematic services supplied by telecommunications stations and/or networks, having a more efficient and improved performance with respect to existing solutions.

Within this framework, it is a main object of the present invention to provide a portable cellular telephone and associated communication system with telematic services supplied by telecommunications stations and/or networks allowing concentration of the terminals required for a subscriber's interaction with the telematic services in one terminal alone, which is not harmful to the subscriber.

European patent application EP-A-781018 discloses a mobile phone device in two parts, one part containing the high-frequency circuits and the other the low-frequency circuits. These two parts can communicate through wire, infrared or ultrasound connection, so that the high-frequency part is capable of being placed at a location where the quality of the radio link is good, while the user can still move relatively freely holding the low-frequency part.

In order to achieve such aims, it is an object of the present invention to provide a portable cellular telephone and associated communication system with telematic services supplied by telecommunications stations and/or networks, incorporating the features of the annexed claims, which form an integral part of the description herein.

DESCRIPTION OF THE DRAWINGS

Further objects, features and advantages of the present invention will become apparent from the following detailed description and annexed drawings, which are supplied by way of non limiting example, wherein.

DESCRIPTION OF THE PREFERRED EMBODIMENT

The inventive idea lies in the use of a cellular telephone as a communication terminal with further telecommunications networks or stations associated with telematic services, which cellular telephone is able to perform usual common terminal functions with respect to the cellular telephony network. According to the present invention, this cellular telephone can be separated in two sections, a first part concentrating the subscriber interface functions, the first section also having a transceiver in communication with telecommunications networks or stations associated with distribution of telematic services, whereas the second part of the cellular telephone houses the power functions associated with the cellular telephone network, which are potentially harmful to the subscriber.

Figure 1:
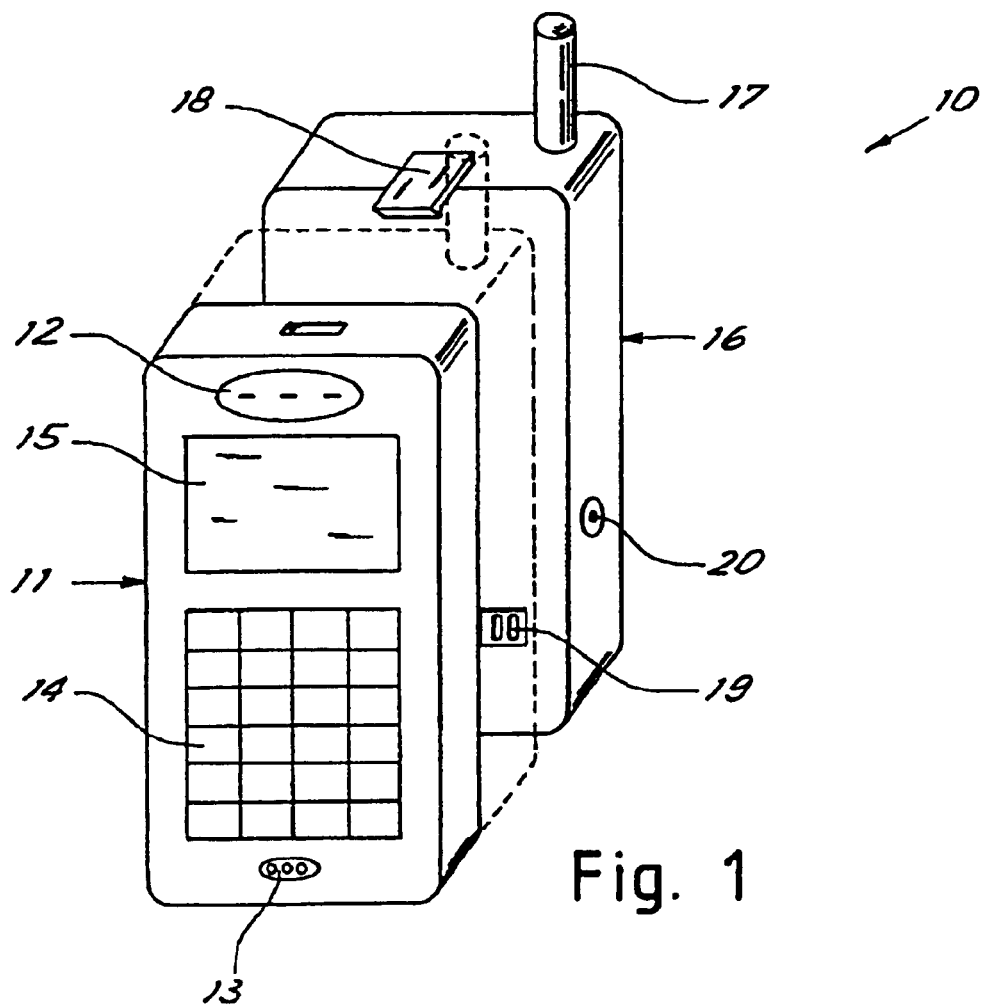
FIG. 1 is an exploded prospective view of a portable cellular telephone according to the present invention.
Figure 2:
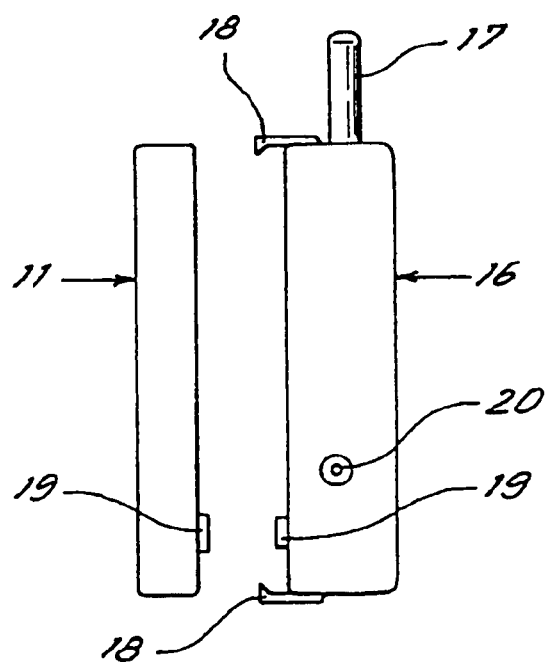
FIG. 2 is a side view of the telephone of FIG. 1.

FIG. 1 shows a portable apparatus for cellular telephone 10, which consists of a first part 11, including the telephone audio section, with earphone 12 and microphone 13, a keyboard 14 and an LCD display 15 which perform the functions of subscriber interface functions, and a second part 16 containing the entire power radio section for reception and transmission from and to the cellular network. For this purpose, the second part has an appropriate antenna 17 and a GSM dual-band DCS transceiver. For simplicity's sake, reference will be made to GSM system; however, any other current or future standard (such as UMTS standard) can be used. The antenna may be either of the "stubby" or "patch" type.

The first and second parts can be assembled together and separated from each other by clips 18. When separated, the first and second parts are in communication with each other via a wireless bi-directional connection.

This connection can be advantageously obtained by a low power radio link, such as at 2.4 GHz frequency with internal antennas, for example provided directly in the printed circuits of the apparatus. Connection can be obtained with any desired protocol, preferably an encrypted protocol, e.g. a BlueTooth standard radio link.

When both parts are assembled, they may have a bidirectional connection through a pair of appropriate connectors 19, joining automatically to each other.

The second part 16 may have a connector 20 for recharging its internal batteries and also the internal batteries of the first part 11 through the connectors 19.

Figure 4:
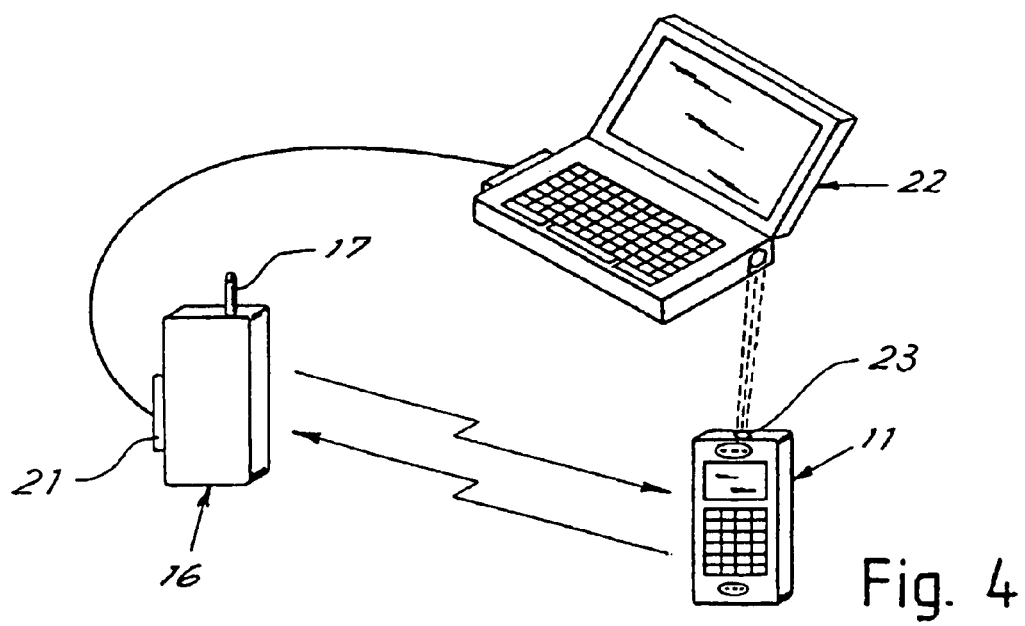
FIG. 4 is a flow diagram of a portable cellular telephone according to the present invention.

As shown in FIG. 4, the second part 16 (also called "power transceiving part") can be equipped with a further interfacing connector 21 for connection to a personal computer 22, to allow a direct digital data exchange with the cellular network (such as to use the second part 16 for a "modem" function). The first part 11, or "control and audio part", may advantageously have an interface 23, such as an infrared one, in particular IrDA, for data exchange with the personal computer, i.e. the telematic services station.

Figure 3:
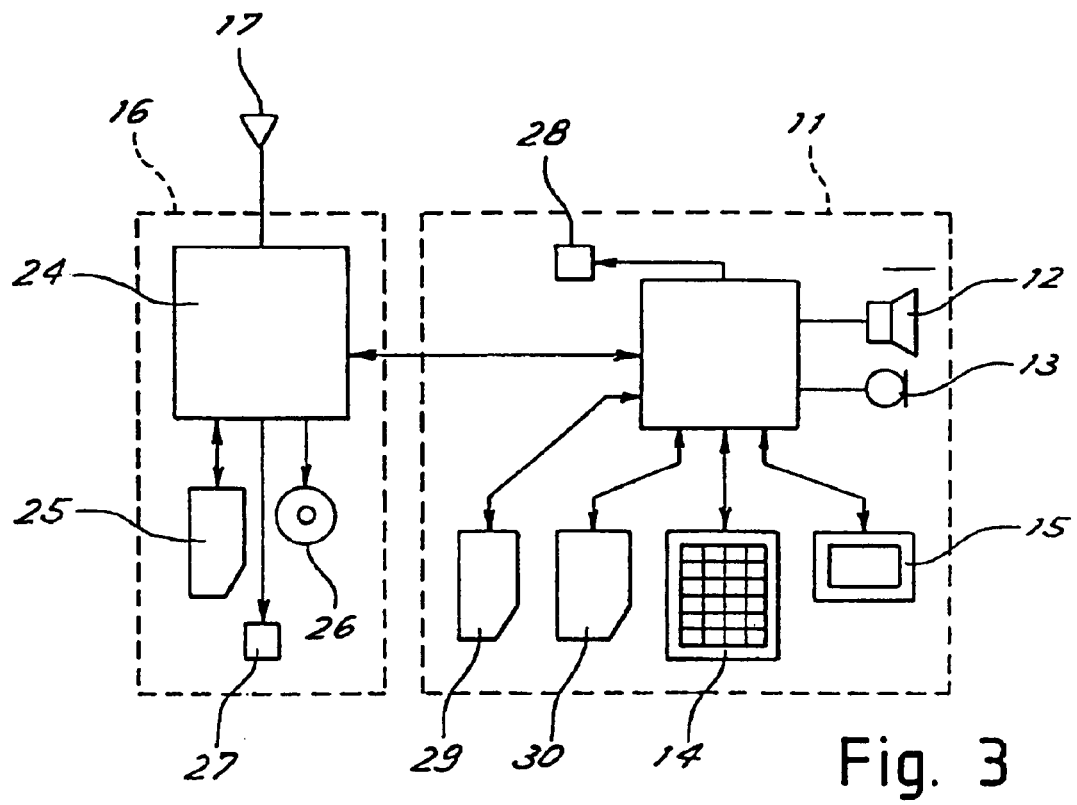
FIG. 3 is a block diagram of the parts forming the telephone of FIG. 1.

FIG. 3 shows a preferred embodiment of the apparatus according to the present invention.

In this preferred embodiment, the power part 16 includes the transceiver section 24 (GSM-DCS or other) mentioned above—which is not further described nor represented since it is a common one and easily conceivable by a man skilled in the art—and a connector 25 for a subscriber identifying module, such as a SIM or UIM, to get access to the network. The part 16 may also have a buzzer 26, to be activated by the part 11 to facilitate finding it should it get lost, and a vibration call indicator 27, which is useful to signal the subscriber about the arrival of a call when both parts are assembled forming a single apparatus. In addition (or alternatively) the part 11 can have its own vibration call indicator 28. This is useful whenever the power section, for example, is located somewhere else (or placed in a case) and only the part 11 is kept in one's pocket.

Referencing FIG. 3, besides the already mentioned earphone 12, microphone 13, display 15 and keyboard 14, the part 11 may also have a connector for SmartCard 29, i.e. a Smartcard can be connected for enabling access to telematic services, and a connector for Multimedia Card 30, i.e. a Flash data memory card or the like.

Figure 5:
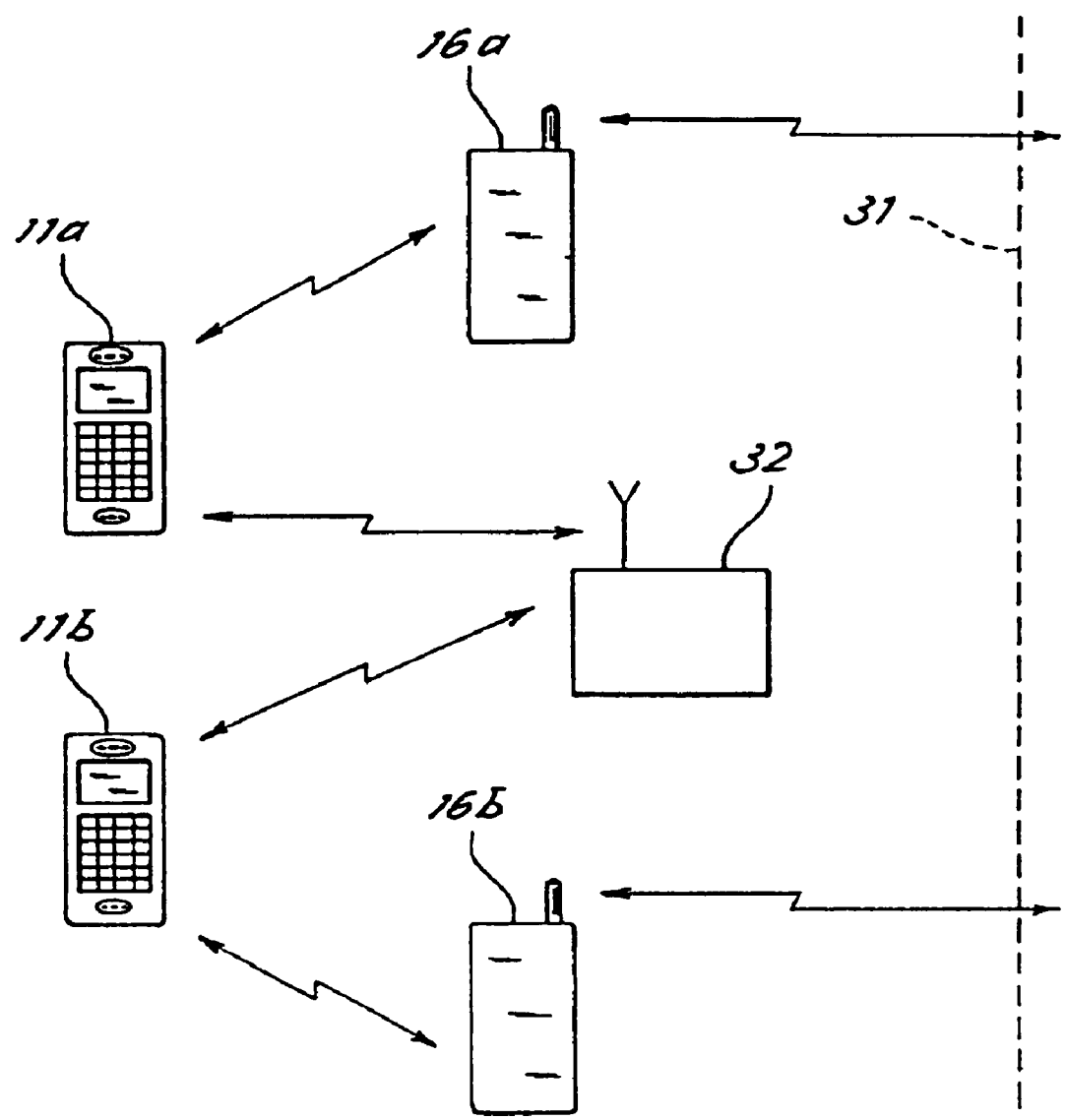
FIG. 5 is a schematic diagram showing a communication system with telematic services supplied by telecommunications stations and/or networks according to the present invention.

FIG. 5 shows a communication system with telematic services supplied by telecommunication stations and/or networks, according to the present invention.

As can be seen in FIG. 5, several telephones according to the present invention (each one having its own respective parts 11, 16) can carry on a dialog with the cellular network 31, to which conventional cellular telephones can have access as well. In addition, each of the telephones according to the present invention may have their part 11 connected (a short distance) to a private station or network 32 through the interface 23 or another wireless communicating device. All units 11 or just the enabled units 11 may connect to this private station or network, e.g. through the SmartCard 29 or Multimedia Card 30.

For example, the station 32 may be installed in the house of a cellular telephone subscriber so as to have a private communication line between home and portable telephone, or be installed within companies wanting an internal communication system (with private access for company employees only) or a dedicated communication system for customers, who can subscribe the service or obtain it as a "bonus". The latter utilization may be advantageous, e.g., for banks.

From the above description the features of the present invention as well as the associated advantages thereof are clear.

Through its separable control and audio part, the portable cellular telephone according to the present invention is advantageously able to interact not only with the standard cellular network, but also with a further station or network through another wireless connecting device arranged on the control and audio part. Advantageously, the subscriber can utilize the control and audio part to have access also to other services not provided by the cellular telephony network, such as company services, bank services or household network services. Moreover, the availability of smartcards and multimedia card connectors allows configuration of the control and audio part as a true multiservice terminal.

The portable cellular telephone according to the present invention can be separated, whenever desired, into a power part to be placed at distance from the subscriber body, and a control and audio part with all subscriber interface functions usually available in a conventional cellular telephone, without any high power radio irradiations located near the subscriber's body.

The portable cellular telephone according to the present invention will advantageously use a radio transmission for connection between the two telephone parts, whose power is much lower than required for GSM transmission.

It is obvious that many changes are possible, for the man skilled in the art, to the portable cellular telephone and communication system with telematic services supplied by telecommunications stations and/or networks thereof described above by way of example, without departing from the novelty and spirit of the innovative idea, and it is also clear that in practical application of the invention the components may often differ in form and size from the ones described and be replaced with technically equivalent elements.

For example, other functions and accessories may be provided, such as an FM radio, MP3 audio decoder functions, Voice Memo and Dialing, Web Browser, etc.

The use of a standard radio link between the two parts will also allow connection of the control and audio module, other than connection with its own power part, to other equipment compatible with this standard. The power part 16 can also be used on its own as a GSM transceiving unit connected to a computer (preferably a portable one) for practical data exchange through the network.

The invention claimed is:

1. A portable cellular telephone, having a first part comprising interface means for performing subscriber interface functions for sending and receiving messages and a second part comprising transceiver means for transmitting and receiving said messages over a telecommunications cellular telephone network, said first part and second part being releasably connected to each other, said second part having sufficient power to transmit over a cellular telephone network, said first part and second part comprising complementary means for wireless bidirectional communication with each other when separated for transmitting messages initiated by said subscriber at said first part to said second part for further transmission over said cellular telephone network, and for transmitting messages received from said cellular telephone network by said second part to said first part for reception by said subscriber, said first part further comprising means for wireless communication with a further telecommunications network or with a telecommunication station, said first part lacking sufficient power to transmit over a cellular telephone network.

2. A portable cellular telephone, according to claim 1, wherein said means for wireless communication comprises a radio.

3. A portable cellular telephone, according to claim 2, wherein when said parts are connected, direct communication takes place therebetween.

4. A portable cellular telephone, according to claim 3, wherein the second part further comprises a connector for the reception and transmission of digital data through the cellular network.

5. A portable cellular telephone, according to claim 1, wherein the means for wireless communication comprises an infrared connection.

6. A portable cellular telephone, according to claim 1, wherein said infrared connection puts the first part in communication with a computer.

7. A portable cellular telephone, according to claim 1, wherein said means for wireless communication comprises a short distance connection to the station or network.

8. A portable cellular telephone, according to claim 1, wherein said means for wireless communication comprises a standard radio link utilized for bidirectional communication with the second part.

9. A portable cellular telephone, according to claim 1, wherein said first part comprises a connector for a Smart-Card or Multimedia Card.

10. A portable cellular telephone, according to claim 1, wherein said means for performing subscriber interface functions comprises a keyboard, a display and means for performing audio functions.

11. A portable cellular telephone, according to claim 1, comprising means for performing FM radio functions and/or MP3 audio decoder functions and/or Voice Memo and Dialing functions and/or Web Browser functions.

12. A communication system with telematic services supplied by telecommunication stations and/or networks, which provides utilization of subscriber terminals for information exchange with said telecommunication stations or networks, comprising a subscriber terminal which includes a portable cellular telephone having a first part comprising interface means for performing subscriber interface functions and a second part comprising transceiver means for transmitting and receiving over a telecommunications cellular telephone network, said second part having sufficient power to transmit over a cellular telephone network, said first part and second part being releasably connected to each other, said first part and second part comprising complementary means for wireless bidirectional communication with each other when separated for transmitting messages initiated by said subscriber at said first part to said second part for further transmission over said cellular telephone network, and for transmitting messages received from said cellular telephone network by said second part to said first part for reception by said subscriber, said first part further comprising means for wireless communication with a further telecommunications network or with a telecommunication station, said first part lacking sufficient power to transmit over a cellular telephone network, said communications system further comprising means for enabling at least one of the telecommunication stations or networks to communicate directly and wireless with said means for wireless communication.

13. A communication system with telematic services supplied by telecommunication stations and/or networks, according to claim 12, wherein the telecommunication station or telecommunication network is a company internal communication station or network and/or a station or network for authorized customers.

14. A communication system with telematic services supplied by telecommunication stations and/or networks, according to claim 13, wherein said company internal telecommunication station or network and/or station or network for authorized customers is a bank services network.

15. A communication system with telematic services supplied by telecommunication stations and/or networks, according to claim 12, wherein said telecommunication station or network is an internal household communication station or network.

* * * * *